United States Patent Office 3,221,065
Patented Nov. 30, 1965

3,221,065
REPLACING A HYDROXYL GROUP WITH A HALOGEN IN CERTAIN POLYNITRATED PHENYL COMPOUNDS
Robert Morgan Vance, Park Forest, Ill., assignor to The Sherwin-Williams Company, Cleveland, Ohio, a corporation of Ohio
No Drawing. Filed June 12, 1964, Ser. No. 374,826
9 Claims. (Cl. 260—646)

This invention relates to a method for replacing a hydroxyl group with a halogen in certain polynitrated phenyl compounds with thionyl chloride in the presence of a solvent reaction medium.

More specifically, this invention provides a novel synthesis for polynitrated monochloro single ring compounds from the corresponding hydroxy analogue by replacement of mono hydroxy substituents in the one position of the benzene ring with chlorine through the advent of treatment of the parent phenol compound with thionyl chloride in the presence of a catalytic or a small fraction of the stoichiometric amount of lower N,N-dialkylformamide in refluxing inert solvent under reflux for extended periods of time.

Specifically this invention relates to the method of manufacture of 2,6 - dinitro - 1-chloro-4-methylbenzene from 2,6-dinitro-1-hydroxy-4-methylbenzene by refluxing the latter parent monohydroxy compound in an inert solvent mixture comprising a major amount of a lower aliphatic chlorinated hydrocarbon and a minor amount of a lower N,N-dialkylformamide containing an excess over theoretical of thionyl chloride.

2,6-dinitro-1-chloro-4-methylbenzene is an intermediate useful in the preparation of 3,5-dinitro-4-N,N-di-n-propyl-aminotoluene, which latter compound is a known, effective herbicide.

Heretofore, 2,6 - dinitro-1-chloro-4-methylbenzene has been reportedly synthesized by treatment of the parent hydroxy analogue with phosphorus oxychloride, or an aryl sulfonyl chloride, in the presence of diethylaniline. It has also been suggested that the pyridine salt of p-toluenesulfonic acid esters of 2,6-dinitro-p-cresol could be split in the presence of the chloride ion. Borrows et al., J. Chem. Soc., Supplement No. 1, page 195 (1919) have suggested preparation of 2,6 - dinitro - 1-chloro-4-methylbenzene through heating 2,6-dinitro-p-cresol with 15 moles of phosphorus oxychloride and N,N-diethylaniline. Borsche and Fiedler, Berichte 46, 2119 (1913) report heating the parent 2,6-dinitro-p-cresol with p-toluenesulfonyl chloride and N,N-diethylaniline. Borsche and Feske, Berichte 60, 159 (1927) report manufacture of 2,6-dinitro-1-chlorotoluene by heating 2,6-dinitro-p-cresyl p-toluenesulfonate at 110° C. with N,N-diethylaniline hydrochloride.

The same authors additionally report improvement by heating 2,6-dinitro-p-cresyl p-toluenesulfonate with excess pyridine, first to form the pyridine salt. The salt is thereafter treated at 160–170° C., later at 190–200° C. with 5N HCl. The second process referred to in this reference is said to provide considerably better yields, reported to be of the order of 70%.

Bunnett et al., J. Amer. Chem. Soc., 76, 3938 (1954) treat 2,6-dinitro-4-methylphenyl-pyridinium p-toluenesulfonate with excess of magnesium chloride and caproic acid by refluxing.

Boothroyd et al., J. Chem. Soc. 1506 (1953) suggest treatment of 3,5-dinitro-o-cresol in diethylaniline and a 12-fold excess of phosphorus oxychloride on a steam bath.

Ullmann et al., Berichte 44, 3735 (1911) indicate treatment of 3,5-dinitro-o-cresol by heating with phosphorus oxychloride in the presence of the same catalytic agent as Boothroyd.

Kubota, J. Chem. Soc. Japan 53, pages 404–9 (1932), discloses treatment of 2,6-dinitrophenol with p-toluenesulfonyl chloride and diethylaniline on a water bath to make 2,6-dinitrochlorobenzene, which was deemed to have some pertinence to the present problem. The latter methods are said to give yields of from 54 to 87% of crude product.

The methods briefly described above and hereinafter tabulated were found inadequate for present purposes. Additional literature and laboratory studies were carried out in an attempt to devise a more efficient and expeditious method of conversion of the hydroxy substituent on a suitably substituted polynitrated aromatic nucleus to manufacture specifically 2,6 - dinitro-1-chloro-4-methylbenzene. The process discovered therefore was also found useful in the particular instances hereinafter shown, but not broadly applicable, as will be seen.

In a series of exploratory preparations, it has been found that a general reaction could be carried out to convert 2,6-dinitro-1-hydroxy-4-methylbenzene to 2,6-dinitro-1-chloro-4-methylbenzene. This is done by refluxing the parent compound in an excess of inert hydrocarbon solvent with an excess over theory of thionyl chloride in the presence of an amount of dimethylformamide. In excess of about 25% by weight of the di-nitrocresol reactant of dimethylformamide is unnecessary and 25% does not represent a critical limitation. In a literature search following the success of preliminary experiments with this reaction, it was found that attempts have been made to use thionyl chloride previously. Illustratively, Hawthorne and Cram, Journal American Chemical Soc. 74, pg. 5861 of 1952, reported attempts to prepare 2-s-butyl-4,6-dinitrochlorobenzene from the corresponding phenol using thionyl chloride and phosphorus pentachloride. Only polymeric materials and unconverted starting material were recovered. References were found indicating use of thionyl chloride in the presence of dimethylformamide for non-analogous reactions, illustratively, conversion of aromatic sulfonic acids to the corresponding acid chloride. U.S. Pat. 2,888,486 to Gregory is pertinent to the foregoing transformation.

A further series of experiments varying the nature and quantity of the inert solvents and reactants in the present process was carried forward. Various inert solvents were tested to determine which best met: (1), the end of carrying the reaction nearest to completion; (2), which gave reasonable reaction rates under reflux conditions; (3), which solvents could be recovered from the reaction mass; (4) without excessive solvent loss; (5) as well as yield the product sought from the inert solvents in a practical manner from the standpoint of the economics involved and quality of recovered product.

It was found that in straight aliphatic hydrocarbon solvents boiling within reasonable reflux ranges, no reaction appeared to occur. When aromatic solvent fractions of commerce such as benzene and toluene were included or substituted for aliphatic solvents, fair yields of relatively impure product were obtained. However, when the chlorinated lower aliphatic hydrocarbons were used as the principal solvent carrier in and for the reaction, relatively more consistent results were obtained. Ethylenedichloride was useful, but the crystallization of the product sought from the solvent reaction medium was relatively poor. Additionally, the reaction was not as complete as, for example, when a chlorinated aliphatic solvent such as carbon tetrachloride was used. 1,1,1-trichloroethane was substituted as the solvent carrier in the reaction medium in another series. The melting point of the crude product indicated the sought-for reaction approached completion. Use of lower aliphatic chlorinated solvents boiling between 47.7° C. and 146° C. including the various isomers of di, tri and tetrachloroethylenes are theoretically useful as replacements in all or part, one for the other, at increased cost, over carbon tetrachloride.

The relationship of the amount of solvent to the amount of dinitrocresol treated produced some variation in yield, but was not found to be critical. When the amount of the solvent is decreased, the end product is obtained in fair yield, but of somewhat less purity.

Studies of the effect of the lower N,N-dialkylformamides as catalyst indicated that when none was present in the reaction medium, no replacement of the hydroxy substituent in the dinitro aromatic ring with chlorine occurred. From 5 to 25% of dimethylformamide based upon the weight of the parent compound, appeared to give useful yields. At about 25% of formamide catalyst, the reaction was complete, but the amount of lower alkylformamide employed in excess over the previous runs using lesser amounts did not appear to provide advantageous results. Thus, it appeared that amounts of catalyst of the order of 25% were considerably in excess of the amount necessary; however, the use of catalyst in excess of the order of that providing maximum yield is uneconomical and offers no advantage. Dimethylformamide is the preferred catalyst.

In an additional series of runs employing homologous reactants under reflux conditions where a standardized optimum reaction mass was employed, it was found that hydroxyl replacement in polynitro-substituted aromatics generally was of a relatively slow nature. At the end of 7 hours in one instance, under reflux conditions, the reaction had not been substantially advanced. The reaction progresses relatively slowly under reflux conditions and it is desirable to continue the reaction for at least 20 hours and preferably in excess of 20 hours in most instances in order to obtain optimum yields and purity of product. In one trial, after more than 22 hours, the melting point range of the crude product was constant, yet by continuing the reaction for an additional 6 hours time (28 hours), both the yield and the melting point of the recrystallized product was substantially improved thereby.

A series of syntheses was run utilizing a number of polynitrated monohydroxybenzenes to determine the effectiveness of the herein described method for hydroxyl replacement with chlorine. Example 2 sets out in short form the series including (a) 2,4-dinitro-1-hydroxy-6-methylbenzene and (b) 6-nitro-1-hydroxy-4-methylbenzene which were inoperative or poorly operative in the inventive process. Examples directed to replacement of the hydroxy group in 2,6-dinitro-1-hydroxy-4-methylbenzene, 2,4-dinitro-1-hydroxybenzene and 2,4,6-trinitro-1-hydroxybenzene (picric acid) were operative and within the scope of the inventive process herein disclosed and claimed.

From the examples the process is operable in polynitrated monohydroxybenzenes where the nitro substituents occupy only the even numbered ring positions starting with the hydroxyl group in the 1-position of the benzene ring. From this it follows the maximum number of nitro substituents is three and the minimum number two. Substituents other than hydrogen or a nitro group may be present in the 4-position, but other substituents, as illustrated by methyl in the 6-position, appear to influence the reaction adversely.

Thus the invention provides a method for substituting a chlorine group for a hydroxyl group in the 1-position of a polynitrated monohydroxybenzene compound of the illustrative structure:

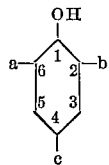

where the substituent groups a, b, and c occupy only the even numbered positions of the benzene ring and a, b and c may all be nitro groups and wherein ring substituents other than hydrogen and nitro groups are permissible only in the 4 (c) position thereof. In the nomenclature herein used, reference to ring positions have been based on the above illustrative structure for purposes of consistency of language in reference to the invention disclosure and claims.

In the examples, all products were recovered through crystallization from the solvent reaction mass.

EXAMPLE 1

A 500 ml. 3-neck flask fitted with thermometer, blade stirrer, and reflux condenser vented to a hood was charged with:

(0.1 mole) 2,6-dinitro-1-hydroxy-4-methylbenzene recrystallized; M.P. 79.5–81° C. _____g__ 19.8
Carbon tetrachloride (Baker A.C.S.) _____ml__ 100
(1.9 g.) N,N-dimethylformamide (Fisher reagent) _____ml__ 2
(0.126 mole) thionyl chloride (Baker purified) __g__ 15

The mixture was heated slowly to reflux (77–8° C.) with stirring. Sulfur dioxide and hydrogen chloride were evolved, and the dinitrocresol gradually dissolved. Heating was continued. At the end of 7 hours the crystallized solids recovered had a melting range of 75–90° C. At the end of 22¾ hours the melting point range had increased to 105–108° C. and continued to remain approximately constant for an additional 6 hour heating period under reflux conditions. A yield of 81.7% of a product having a melting point between 112 and 114° C. was obtained. The yield and purity after the 6 hour additional reaction time has suggested the benefit of prolonged reaction beyond the time when one obtains a maximum melting point of the crude reaction mass.

Subsequent to the 28¾ hour reaction time, the reaction mass was filtered through a heated gravity funnel and the funnel thereafter rinsed with 5 ml. of carbon tetrachloride. The filtered medium was crystallized by cooling and stirring to room temperature. A further crop of crystals was obtained by cooling the recovered mother liquor in an ice bath.

Crystals were recovered by filtering on a Buchner funnel. An infra-red scan indicated the purity of the recovered 2,6-dinitro-1-chloro-4-methylbenzene crystals to be 97%, melting point 112–114° C.

To determine the scope of applicability of the method, the following examples were carried forward, using the general procedures of Example 1, but substituting the monohydroxy substituted nitrophenyl compounds illustrated.

EXAMPLE 2

(a)

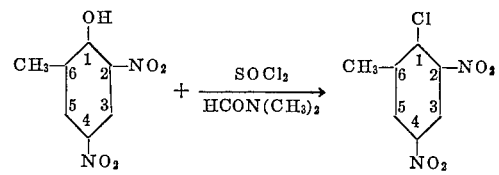

Using 2,4-dinitro-1-hydroxy-6-methylbenzene, melting at 85–87° C. the anticipated product, namely 2,4-dinitro-1-chloro-6-methylbenzene should melt at 63–65° C. The isolated product melted over a 50° to 135° C. range and obviously provided an inoperative procedure for our purposes.

EXAMPLE 3

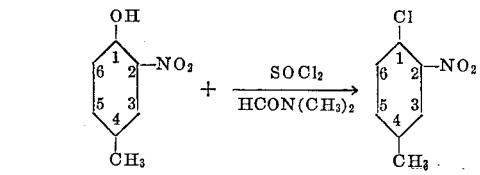

1-hydroxy-2-nitro-4-methylbenzene was processed according to the method outlined in Example 1. The anticipated product 1-chloro-2-nitro-4-methylbenzene was not found among the several fractions isolated.

The examples above serve to illustrate the selective nature of the process. Apparently one cannot predict in general that chlorine groups may be substituted for hydroxyl groups in nitrated aromatic compounds.

EXAMPLE 4

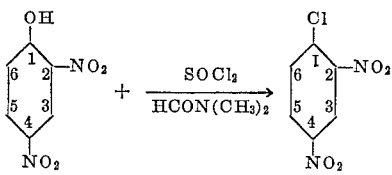

As shown schematically above, in accordance with Example 1, 2,4-dinitro-1-hydroxybenzene was reacted with thionyl chloride in the presence of dimethylformamide. Two crops of crystals were obtained from the $CCl_4$ solution, totaling 96% of theory. M.P. of the first crop (42% yield) was 44–46.5° C. as compared with an authentic sample at 51–55° C. The above method was considered commercially feasible to produce 2,4-dinitro-1-chlorobenzene, a reagent useful in the determination of pyridine compounds including nicotinic acid, nicotinamide, etc.

EXAMPLE 5

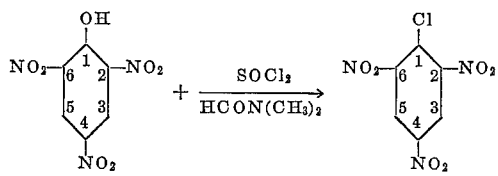

2,4,6-trinitro-1-hydroxybenzene (picric acid) was heated in accordance with the details of Example 1 to manufacture 2,4,6-trinitro-1-chlorobenzene (picryl chloride). An 86.5% yield of picryl chloride having a M.P. of 81.3° C. was obtained. Picryl chloride has a M.P. of 83° C.

Picryl chloride finds among its uses that of formation of derivatives of polynuclear hydrocarbons for separation and identification of the specific hydrocarbon compounds.

*Table I.—Report of prior art evaluation*

| General Method | Yield, percent | Reference |
|---|---|---|
| (a) 2,6-dinitro-1-hydroxy-4-methylbenzene heated with 15 mols $POCl_3$ and N,N-diethylaniline. | 18.3 | Borrows et al., J. Chem. Soc. Supp. #1, 195 (1919). |
| (b) 2,6-dinitro-1-hydroxy-4-methylbenzene treated 4 hours at 85° C. with 1 mol of p-toluenesulfonyl chloride and 2 mols of N,N-diethylaniline. | ---------- | Borsche, Fiedler, Ber. 46, 2119 (1913). |
| (c) 2,6-dinitro-1-hydroxy-4-methylbenzene sulfonate heated 6 hrs. at 110° C. with N,N-diethylaniline hydrochloride. | 10–15 | Borsche, Feske, Ber. 60, 159 (1927). |
| (d) As in c, but heated with excess pyridine to form salt. Heat at 160–170° C. 8 hrs; then 190–200° C. with 5 N.HCl. | 70 | (As in c above.) |
| (e) 2,6-dinitro-4-methylphenylpyridium p-toluene sulfonate plus $MgVl_2.6H_2O$ plus 1 liter caproic acid. Refluxed 2 hours. | 54 | Bunnett et al., J. Am. Chem. Soc. 76, 3938 (1954). |
| (f) 3,5-dinitro-1-hydroxy-2-methylbenzene plus N,N-diethylaniline 12 fold excess $POCl_3$, 2 hours on steam bath. | [1] 87 | Boothroyd & Clark, J. Chem. Soc. 1506 (1953). |
| (g) 3,5-dinitro-1-hydroxy-2-methylbenzene $POCl_3$ and N,N-diethylaniline. | 73 | Ullmann & Sane, Berichte 44, 3735 (1911). |
| (h) 2,6-dinitro-1-hydroxybenzene plus paratoluene-sulfonyl chloride plus N,N-diethylaniline, 15 hrs. water bath. | 75 | Kubota, J. Chem. Soc. Japan 53, 404– 1932. |

[1] Crude.

Having described the best mode of practice of my invention what I claim is:

1. The method for substituting a chlorine group for a hydroxy group in the first position of a polynitrated monohydroxy single ring compound of the illustrative structure:

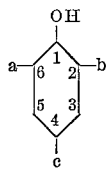

wherein the substituent groups a, b, and c thereof occupy only the even numbered positions of said ring; wherein a is limited to a nitro group, b is limited to hydrogen and nitro groups and c is limited to methyl and nitro groups; which comprises refluxing the 1 position hydroxy substituted parent in a reaction medium consisting essentially of a major amount of a lower aliphatic chlorinated hydrocarbon solvent, a minor amount of a N,N-di-substituted lower-alkylformamide and an amount in excess over theory of thionyl chloride for time sufficient to convert the 1 position hydroxyl group in the parent reactant substantially over to a chlorine group.

2. The process of claim 1 wherein the lower alkyl formamide is dimethylformamide.

3. The process of claim 1 wherein the amount of lower alkylformamide is present in a catalytic amount but not essentially more than about 25% by weight of the parent polynitrated monohydroxy single ring compound.

4. The method of claim 1 wherein the time of refluxing is in excess of 20 hours.

5. The process of claim 1 wherein the time of refluxing is in excess of 26 hours.

6. The process of claim 1 wherein reaction mixture consists essentially of a major amount of carbon tetrachloride, a minor amount of N,N-dimethylformamide and an excess over theory of thionyl chloride.

7. The method of manufacture of 2,6-dinitro-1-chloro-4-methylbenzene from 2,6-dinitro-1-hydroxy-4-methylbenzene which comprises refluxing the parent monohydroxy substituted dinitro reactant in a solvent mixture consisting essentially of a major amount of a lower aliphatic chlorinated hydrocarbon solvent, a minor amount of a N,N-di-substituted lower-alkylformamide and an amount excess over theory of thionyl chloride for time sufficient to convert the 1 position hydroxyl group in the parent reactant substantially over to a chlorine group.

8. The method of manufacture of picryl chloride which comprises refluxing picric acid in a reaction medium consisting essentially of a major amount of a lower aliphatic chlorinated hydrocarbon solvent, a minor amount of a N,N-di-substituted lower-alkylformamide and an amount excess over theory of thionyl chloride for time sufficient to convert the hydroxyl group in the parent acid substantially over to a chlorine group.

9. A method of manufacture of 2,4-dinitro-1-chlorobenzene from 2,4-dinitro-1-hydroxybenzene which comprises refluxing the latter parent reactant in a reaction medium consisting essentially of a major amount of a lower aliphatic chlorinated hydrocarbon solvent, a minor amount of a N,N-di-substituted lower-alkylformamide and an amount excess over theory of thionyl chloride for time sufficient to convert the parent 1-hydroxy substituent substantially over to a chlorine group.

No references cited.

CARL D. QUARFORTH, *Primary Examiner.*

REUBEN EPSTEIN, *Examiner.*